May 23, 1972  W. E. SKIDMORE ET AL  3,664,612
AIRCRAFT ENGINE VARIABLE HIGHLIGHT INLET
Filed Dec. 22, 1969  2 Sheets-Sheet 2

INVENTORS:
WILTON S. VIALL
WALLACE E. SKIDMORE
BJARNE E. SYLTEBO

BY
*Bernard Donahue*
ATTORNEY

United States Patent Office 3,664,612
Patented May 23, 1972

---

3,664,612
AIRCRAFT ENGINE VARIABLE HIGHLIGHT INLET
Wallace E. Skidmore, Redmond, Bjarne E. Syltebo, Bellevue, and Wilton S. Viall, Des Moines, Wash., assignors to The Boeing Company, Seattle, Wash.
Filed Dec. 22, 1969, Ser. No. 887,181
Int. Cl. F02b 27/02; F02k 11/00; B64d 29/00
U.S. Cl. 244—53 B          4 Claims

ABSTRACT OF THE DISCLOSURE

An aircraft jet engine leading edge double foil structure comprising a pivotally mounted exterior foil which forms the leading edge contour and exterior cowl fairing in a closed position during high-speed flight and which is responsive to aerodynamic pressures to pivot to expand the leading edge diameter or highlight during take-off or low-speed flight. A pivotally mounted interior foil acts as an internal cowling fairing for high-speed flight and pivots to combine with said exterior foil to form an aerodynamically clean auxiliary air intake passageway which directs the auxiliary air longitudinally along the interior wall of the intake cowling, thereby providing boundary layer control and decreasing pressure recovery losses.

BACKGROUND OF THE INVENTION

This invention relates to nacelle air inlet systems for aircraft and, more particularly, to an axisymmetric pitot type inlet with a variable geometry primary intake and an auxiliary passageway.

During high-speed flight, a thin sharp entry lip of minimum diameter is desirable to minimize nacelle drag. Such an entry lip is adequate to supply a sufficient quantity of air to the engine during high-speed flight because of the ramming effect due to the velocity of the aircraft. However, such a minimum diameter thin entry lip will not give adequate performance during take-off and low-speed flight when the engine demands a large airflow under full power conditions. For take-off and low-speed conditions a large diameter fat entry lip of a bellmouth type is ideal to prevent lip loss turbulence and loss of boundary layer control in the primary passageway.

Auxiliary intake passages of the type located substantially aft of the lip area of the cowling and opening near the engine fan face have been used to increase air intake during low-speed flight. However, such aft located auxiliary passages do not operate effectively when used with inlets having thin entry lips.

In the design of pitot type inlets, the highlight diameter is defined as the diameter measured to the points where the lip leading edge slopes are normal to the inlet centerline. The inlet throat is located where minimum duct flow occurs. Lip area ratio provides a measure of lip thickness and is defined as $A_{hl}/A_{th}$ where $A_{hl}$ is the area of the inlet highlight and $A_{th}$ is the area of the inlet throat. Conventional aft located auxiliary passageways usually require lip area ratios of 1.18 or higher to operate effectively. Such high lip area ratio inlets generate undesirable drag penalties for subsonic aircraft having high cruise velocities.

In the design of an aircraft engine air intake system, inlet pressure recovery is a significant parameter which is defined as $P_{T2}/P_{T\infty}$ where $P_{T2}$ is the total pressure at the engine face and $P_{T\infty}$ is the freestream total pressure. For an optimum inlet design, minimum pressure recovery under cross-wind conditions at take-off power should be 97%; pressure recovery must approach 100% below 100 knot airplane velocity at take-off power. Recovery losses during climb and cruising flight are intolerable.

SUMMARY OF THE INVENTION

In accordance with the foregoing, it is an object of this invention to provide an inlet having a variable highlight area which is sized for high-speed flight but can be effectively increased for low-speed operation.

A related object of this invention is to provide such a variable highlight area inlet which is responsive to air pressures acting on the inside and outside of the engine nacelle cowling so as to be entirely automatic in operation.

A further objective of this invention is to provide an inlet with a leading edge auxiliary air passageway of aerodynamically clean design which in addition to supplying auxiliary air is effective to provide boundary layer control in the primary inlet passageway.

A further object is to provide acoustic damping of noise generated by the passage of auxiliary air into the engine.

The above objectives are achieved in this invention by the provision of a plurality of pivotable foil members at the leading edge of the forward engine cowling. Exterior foil members form a leading edge of optimum highlight diameter during cruise flight and are responsive to aerodynamic pressures to pivot to a position of increased highlight diameter for low-speed operation. Interior foil members form a fairing of the inside cowling during cruise and are responsive to aerodynamic pressures to pivot to cooperate with the exterior foils in forming a continuation of the increased highlight primary entry and in forming an aerodynamically clean leading edge auxiliary air passageway which directs air longitudinally along the wall of the primary inlet for boundary layer control and acoustical damping.

BRIEF DESCRIPTION OF THE DRAWINGS

FIG. 1 provides an isometric view of the forward portion of an aircraft engine nacelle inlet structure incorporating a series of inlet lip vanes constructed according to the teachings of this disclosure. A fan jet engine cowling 10 is shown to have a leading edge lip 12 surrounding an engine centerbody fairing 14. Strut members 16 provide a rigid continuation of the fan cowling 10 and, as will later become apparent, pivotally receive exterior foil sections 18 and interior foil sections 20. In the cruise flight condition shown in FIG. 1, the exterior foils 18 fair into the smooth aerodynamic shape established by cowling 10 and the struts 16. The interior foils 20 likewise fair into the internal inlet shape established by the cowling and strut inlet srtucture.

FIG. 2 shows the FIG. 1 inlet structure in a position for low-speed flight wherein the exterior foils 18 and interior foils 20 have been pivotally displaced by aerodynamic pressures acting on the external and internal surfaces of the cowling. In this position the inlet structure provides an increased highlight diameter and auxiliary air passageways are formed by each coacting pair of foils 18 and 20 in combination with an internal surface of the cowling. The foils are spring-biased to react to predetermine pressure conditions to pivot into a position to form one wall of an aerodynamically clean passageway to admit air which would otherwise pass over the exterior cowling surface.

FIG. 3 is a schematic cross-sectioned view of a fan jet forward cowl incorporating exterior foils 18 and interior foils 20 positioned for cruise flight operation. Foils 18 can be seen to include a relatively sharp leading portion which defines a highlight diameter $H_h$ measured between points where the lip slope is normal to the engine centerline. The inlet throat diameter $T_h$ is measured where minimum duct flow occurs. For high cruise speed subsonic aircraft such as are contemplated for the preferred embodiment of this invention, the lip area ratio ($A_{hi}/A_{th}$, as previously defined) is preferably of the order of 1.09 or less in order to minimize cruise drag penalties.

FIG. 3 depicts an engine installation and fan cowl comprising a forebody portion 30, a boattail portion 32, support struts 34, and a fan 36. It is to be noted that in the position shown, the exterior foil 18 provides a smooth continuous fairing for the leading edge and the outer forward portion of the cowl forebody 30. Similarly, the interior foil 20 provides an interior inlet fairing which extends from the leading edge of the forebody 30 to its central portion.

FIG. 4 shows the exterior foil 18 and interior foil 20 after they have been pivoted into position for low-speed flight. Under the influence of differential pressures acting on the cowl forebody 30, the foil members 18 have pivoted such that their normal slope points now define a highlight diameter $H_L$ which is substantially greater than the cruise position highlight diameter $H_H$.

Figure 1:
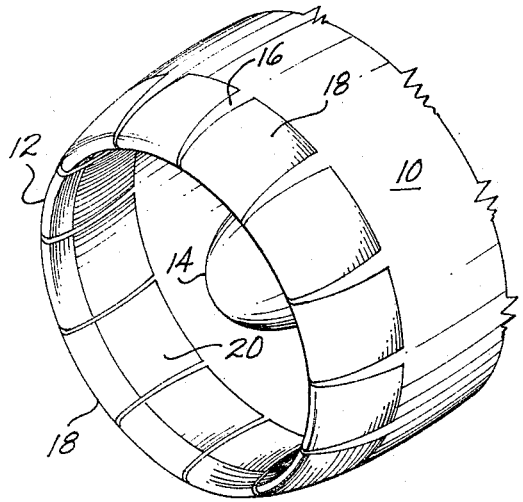
FIG. 1 is a fragmented isometric view of an aircraft engine inlet constructed according to this disclosure and shown in the high-speed flight condition.
Figure 2:
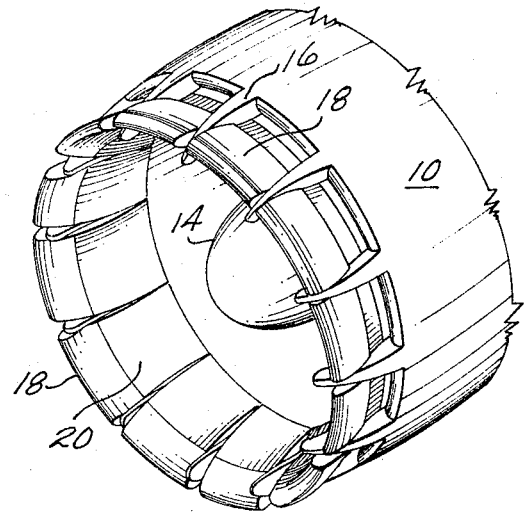
FIG. 2 is a showing of the inlet of FIG. 1 in the low-speed or take-off flight condition.

The foils 20 have likewise responded to pressure differentials to pivot to coact and combine with foils 18 to form leading edge segments which are aerodynamically clean airfoils. The outer foil portions 40 and 42 define the forward surface of an auxiliary air passageway which will direct auxiliary air aft and outwardly along the inner wall 43 of the cowl forebody. An interior surface 44 of forebody 30 provides the aft wall of the auxiliary passageway. The passageway so defined is preferably continuously converging in area and the surfaces 40 and 42 designed to draw optimum auxiliary airflow and redirect it aft and outwardly along a substantial length of the cowl interior forebody. With a leading edge auxiliary passageway constructed in this manner, airflow control is exercised over a maximum length of intake duct ahead of the fan face. As will now be apparent to persons skilled in this art, such maximum length flow control may be utilized for the purpose of increasing the primary inlet duct efficiency through boundary layer control, and for maximizing the acoustic dampening benefits attainable through the use of a maximum length acoustic liner on the inner wall 43 of cowl forebody 30.

Figure 3:
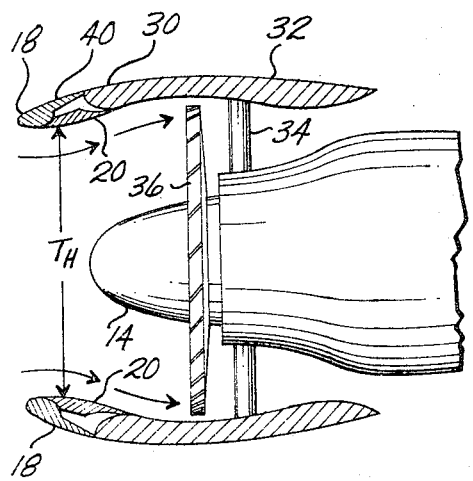
FIG. 3 is a cross-sectional view of a high bypass ratio front fan engine cowling incorporating the inlet of FIGS. 1 and 2 and shown in a high-speed flight condition.
Figure 4:
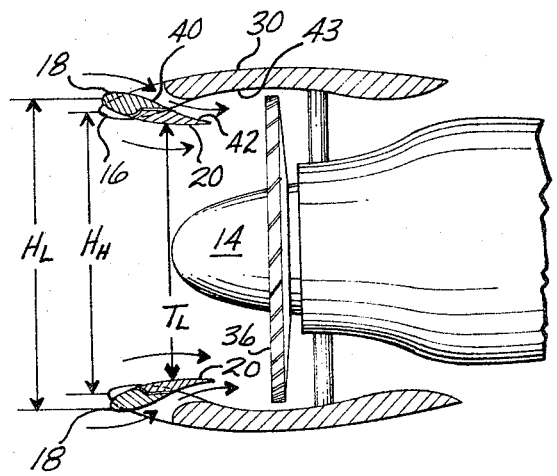
FIG. 4 is a cross-sectional view similar to FIG. 3 showing the inlet in the low-speed or take-off flight condition.

It is to be noted that in the FIG. 4 low-speed inlet position, the plane of minimum duct flow, as defined by the throat diameter $T_L$, has shifted slightly aft with respect to the corresponding plane of FIG. 3. The FIG. 4 lip area ratio has substantially increased over the FIG. 3 position. The FIG. 4 primary inlet is approaching a classic bellmouth shape, with lip turbulence losses during low-speed operation reduced to an acceptable level.

Figure 5:
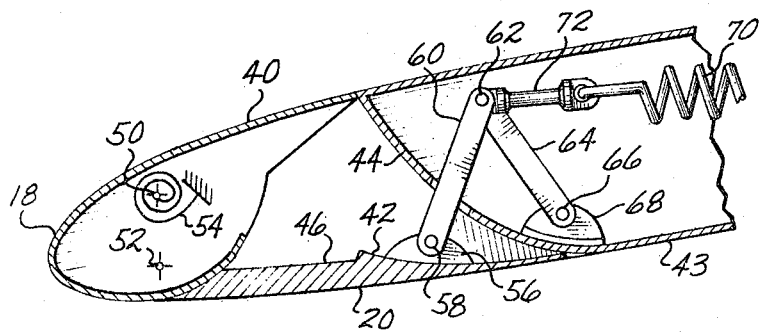
FIG. 5 is a detailed cross-sectional view of the inlet foil members disposed for high-speed flight.

FIG. 5 is an expanded cross-section view of the cowl forebody showing the exterior foil 18 and interior foil 20 positioned for cruise flight. The foil 20 comprises an aft portion 42 and an intermediate portion 46. Foil 18 is pivotally mounted on strut 16 at point 50 while foil 20 is similarly pivotally mounted at point 52 on the strut. The two foils may be physically interconnected by conventional mechanical linkages for concurrent movement into their respective positions for cruise and low-speed flight, or may be independently supported as shown. An independent mounting is shown here for purposes of simplicity. Accordingly, the foil 18 is shown schematically to be individually spring-biased into the cruise position as by torsion springs 54 anchored to the struts 16. Obviously, if the two foils are interconnected by linkages, then a single biasing system will be sufficient for both foils. Such a single biasing system could be similar to the axial tension spring system shown to be attached to a lug 56 of the interior foil 20 at point 58. A member 60 extends from point 58 through a slot in wall surface 44. Member 60 is connected to a pivot point 62. A member 64 is pinned at 62 and attached at 66 to a grounding bracket 68 which is rigidly affixed to the forebody structure. An axial tension spring 70 is anchored in aft cowl structure (not shown) and is connected to point 62 by means of a fitting 72.

It will readily be apparent that in the system shown in FIG. 5, the preload of springs 54 and 70 may be set at any desired predetermined value to cause movement of the foil sections in response to a particular value of pressure differential acting on the cowl structure.

Figure 6:
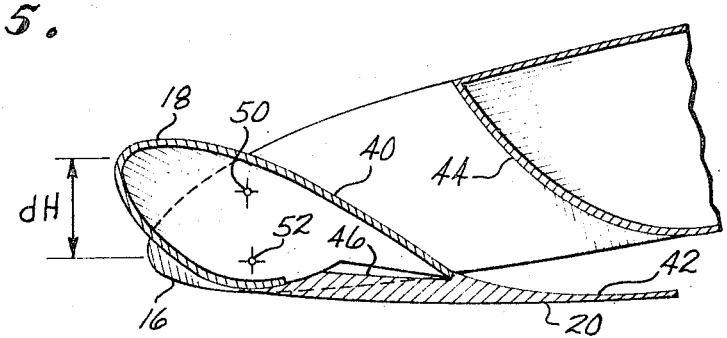
FIG. 6 is a view similar to FIG. 5 with the foils shown in the low-speed or take-off position.

FIG. 6 is a view similar to FIG. 5, with the foils shown in their low-speed flight positions. Foil 18 has been pivotally displaced about point 50 to a position where the highlight diameter has been effectively increased by a distance $dH$, as shown. The interior foil 20 has been displaced about point 52 into its low-speed position as controlled by stop means (not shown) associated with the linkage mechanism. The foil 18 is either nesting against the intermediate portion 46 of foil 20 or is positioned by other stop means (not shown) in its own support system.

The combined foil system 18 and 20 can be seen in FIG. 6 to present a unitary airfoil section in which the interior surface approaches the classic bellmouth shape having a negative rate of change of slope in an aft direction, which is ideal for prevention of lip turbulence losses. Because of the pivoting of foil 20 the primary intake throat diameter is effectively reduced slightly and the plane of minimum duct flow is moved aft. The exterior surfaces 40 and 42 combine with surface 44 to form an aerodynamically clean and gradually converging auxiliary air passageway. It is to be noted that the exterior surface 42, of foil 20, changes the direction of flow of the auxiliary air to direct it generally longitudinally aft along the inner wall 43 where it can be exposed to acoustic dampening materials and used for boundary layer control in the main inlet passageway.

Figure 7:
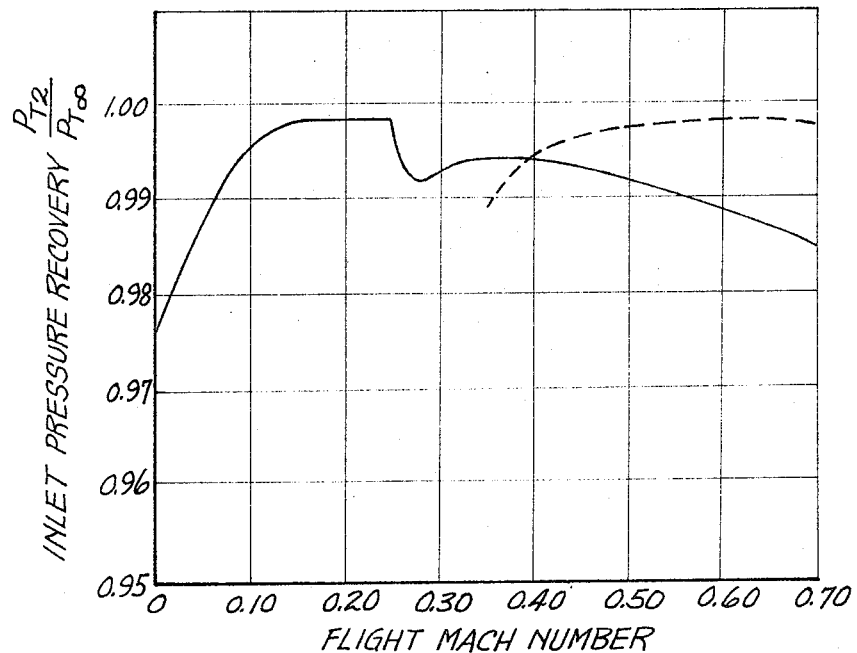
FIG. 7 is a plot of inlet pressure recovery vs. flight Mach number which is attainable with the inlet of this invention.

FIG. 7 illustrates wind tunnel test data on engine face pressure recovery during take-off, rotation, and climb-out on an inlet system constructed according to the teachings of this disclosure. From the intersection of the "doors open" and "doors closed" curves, the desired door closing Mach number is determined for the purpose of establishing the biasing system design forces. The air pressure loads tending to actuate the doors, or foils, in flight may be computed approximately by taking into account such diverse factors as local velocities, angle of attack, and mechanical friction. However, wind tunnel and flight testing should be conducted, using foils which are instrumented with surface pressure taps and strain gages. Using data from such instrumentation, hinge moment calculations may be used to determine the spring-biasing force necessary to close the doors. The inlet pressure recovery levels shown in FIG. 1 are to be regarded as typical and developmental in nature. For example, considerable improvement can be, and has been, obtained in the low Mach number (below .10) doors open values shown by optimizing design and shaping parameters.

In light of the foregoing, it will be apparent to persons skilled in this art that the disclosed system will be effective to alleviate engine surge conditions during low-speed flight. This effectiveness is due in large measure to the bellmouth shape of the primary entry and the efficiency of the auxiliary air passageway in directing air for boundary layer control. In contrast to most prior art inlet schemes, the system disclosed is particularly effective in maintaining reasonably even pressure distribution at the fan face during crosswind conditions.

It should be noted that while the preferred embodiment discussed above has utilized pressure actuated foils, or doors, for purposes of obtaining simple and foolproof automatic operations, that foils of the type here disclosed could be power actuated to obtain similar inlet efficiency benefits. Power actuation would, of course, be heavier, more costly and more subject to malfunction. However, in certain design situations, such as extremely large design forces, or high engine sensitivity to surge, it may be desirable or necessary to use such power actuation in spite of its inherent penalties. To modify the preferred embodiment disclosed here to obtain a powered system would of course require no more than the proper location of power actuators at appropriate points in the support and linkage mechanisms shown. A control system for a powered actuation system could be made responsive to sensed aerodynamic pressures or to aircraft flight parameters, with suitable provision for manual override.

We claim:

1. An air inlet for an aircraft engine having a forward cowling with an outer surface exposed to ambient air and an inner surface forming the primary passageway for intake of air to said engine, means for varying the highlight area of said primary passageway comprising: a plurality of exterior foil means defining the leading edge lip contour of said forward cowling and establishing the inlet highlight area for intake of air into said primary passageway, wherein said exterior foil means are selectively pivotable about axes located within the lip leading edge contour, from first positions for cruise flight to second positions for low speed flight, said exterior foil means being shaped and arranged such that in said first positions they form a relatively thin leading edge contour faired into each of said outer and inner surfaces and having a predetermined cruise inlet highlight area and a lip area ratio of the order of 1.09 or less; and in said second positions they form a relatively fat bellmouth type smooth leading edge contour having a highlight area substantially greater than said cruise inlet highlight area.

2. An air inlet for an aircraft engine having a forward cowling with an outer surface exposed to ambient air and an inner surface forming the primary passageway for intake of air to said engine, means for varying the highlight area of said primary passageway and for opening an auxiliary air inlet passageway through said forward cowling comprising: a plurality of exterior foil means defining the leading edge lip contour of said forward cowling and establishing the inlet highlight area for intake of air into said primary passageway, a plurality of interior foil means forming a portion of said inner surface, wherein said exterior and said interior foil means are selectively pivotable about separate axes located within the lip leading edge contour, from first positions for cruise flight to second positions for low speed flight, said exterior foil means being shaped and arranged such that in said first positions they cooperate to form a relatively thin leading edge contour faired into each of said outer and inner surfaces and having a predetermined cruise inlet highlight area and a lip area ratio of the order of 1.09 or less; and in said second positions they cooperate to form a relatively fat bellmouth type smooth leading edge contour having a highlight area substantially greater than said cruise inlet highlight area and also form a smooth aerodynamically clean continuously converging auxiliary air inlet passageway through said forward cowling which directs the flow of auxiliary air longitudinally aft and outwardly along said innerwall for boundary layer control in the primary passageway.

3. The air inlet of claim 1 wherein said exterior foil means forms a leading edge contour in either of said first or second positions, and forms an external fairing of said cowling in said first position while forming a wall of an auxiliary air passageway through said forward cowling in said second position.

4. The air inlet of claim 3 which includes a pivotally mounted interior foil means which forms an internal fairing for said forward cowling in a first position and which is responsive to changing flight conditions to pivot to a second position where it combines with said exterior foil means to provide an aerodynamically clean auxiliary air intake passage to direct air through said cowling and longitudinally aft along the interior wall of said cowling for boundary layer control and to decrease pressure recovery losses.

References Cited
UNITED STATES PATENTS

| | | | |
|---|---|---|---|
| 3,222,863 | 12/1965 | Klees et al. | 244—53 B X |
| 2,699,906 | 1/1955 | Lee et al. | 244—53 B |
| 3,533,486 | 10/1970 | Poulson | 137—15.1 X |
| 3,446,223 | 5/1969 | Hancock | 137—15.2 |
| 3,572,961 | 3/1971 | Medawar | 60—269 |
| 3,618,876 | 11/1971 | Skidmore et al. | 137—15.1 |

ANDREW H. FARRELL, Primary Examiner

U.S. Cl. X.R.

137—15.1, 15.2; 60—39.29